Aug. 21, 1923.
J. H. CLARK
1,465,345
ATTACHMENT FOR VEHICLE WHEELS
Filed March 26, 1923   3 Sheets-Sheet 1
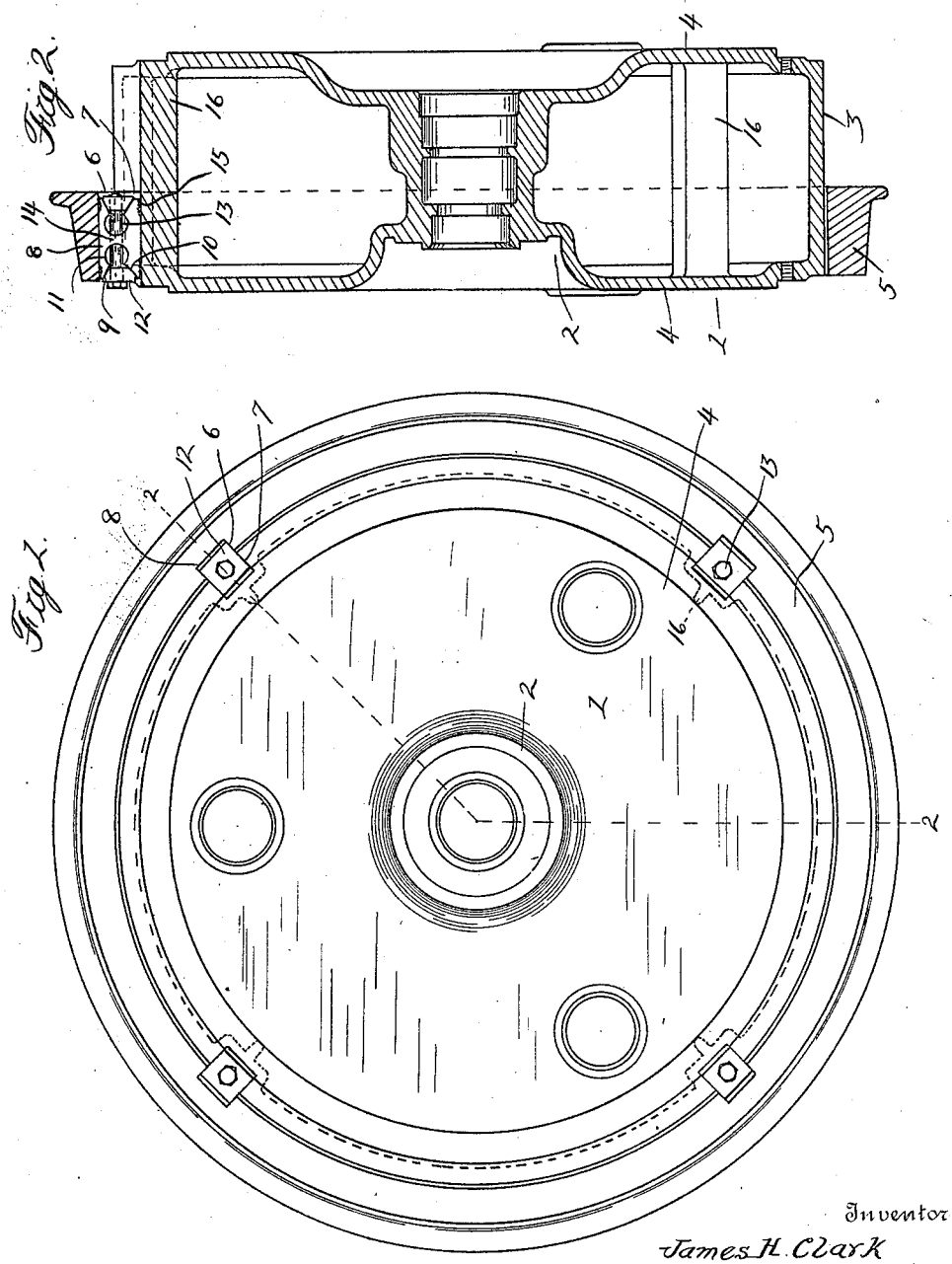
Inventor
James H. Clark Aug. 21, 1923.　　　　　　　　　　　　　　　　1,465,345
J. H. CLARK
ATTACHMENT FOR VEHICLE WHEELS
Filed March 26, 1923　　　3 Sheets-Sheet 2

Inventor
James H. Clark

By Whittemore Hulbert Whittemore
& Belknap　　Attorneys

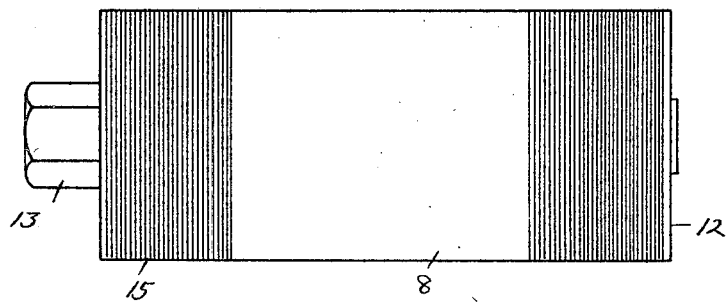
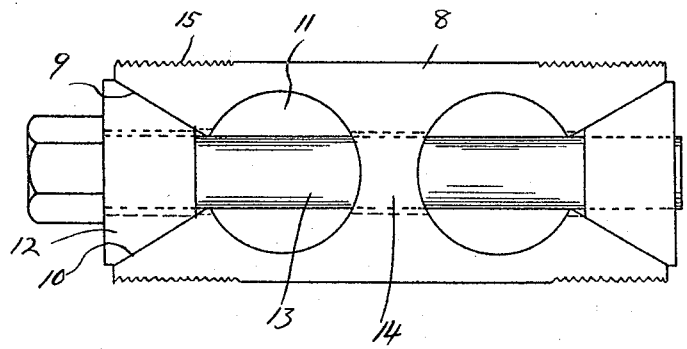
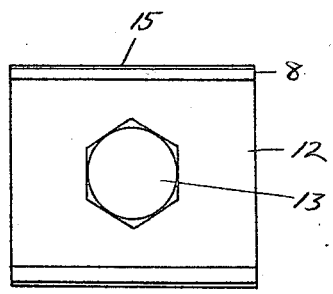

Patented Aug. 21, 1923.

1,465,345

UNITED STATES PATENT OFFICE.

JAMES H. CLARK, OF RIVER ROUGE, MICHIGAN.

ATTACHMENT FOR VEHICLE WHEELS.

Application filed March 26, 1923. Serial No. 627,922.

*To all whom it may concern:*

Be it known that I, JAMES H. CLARK, a citizen of the United States of America, residing at River Rouge, in the county of Wayne and State of Michigan, have invented certain new and useful Improvements in Attachments for Vehicle Wheels, of which the following is a specification, reference being had therein to the accompanying drawings.

This invention relates to vehicles and refers more particularly to attachments for the wheels thereof for permitting the vehicle to travel upon the rails of a track.

An object of the invention is to provide a simple attachment which may be readily adjusted so that the vehicle may travel upon tracks of different gauges.

Another object is to provide a strong and durable construction which may be quickly and easily applied to or removed from the wheels of a vehicle.

With the above and other objects in view the invention consists of certain novel features of construction, combination and arrangement of parts as will be more fully described and particularly pointed out in the appended claims.

In the accompanying drawings:—

Figure 1 is a side elevation of a wheel embodying my invention and having the attachment applied thereto;

Figure 2 is a sectional view taken on line 2—2 of Figure 1;

Figure 5 is a top plan view of the key;

Figure 6 is a side elevation of the key;

Figure 7 is an end elevation of the key.

Figure 3:
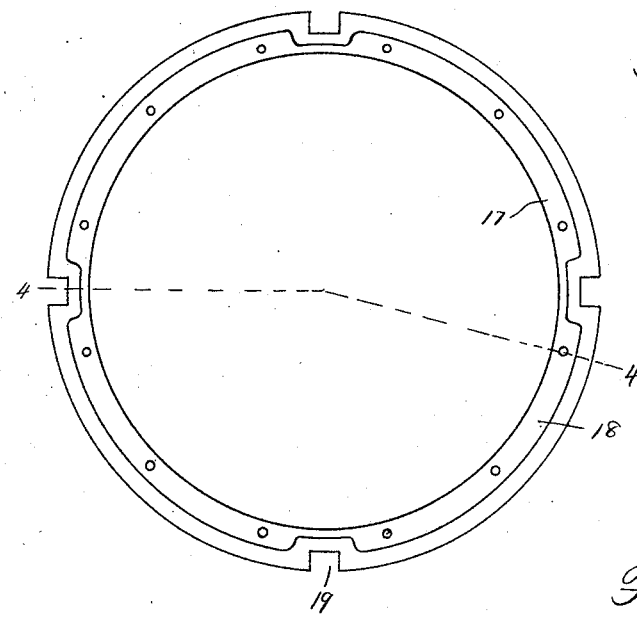
Figure 3 is a side elevation of the annular member.
Figure 4:
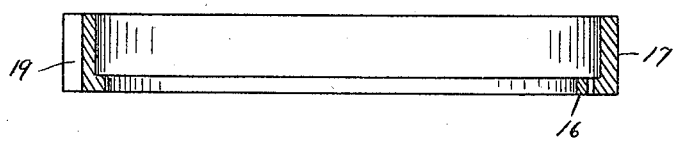
Figure 4 is a sectional view taken on line 4—4 of Figure 3.
Figure 8:
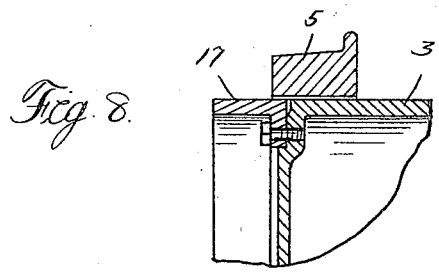
Figure 8 is a fragmentary sectional view of the flanged rim upon the annular member and wheel.

Referring now to the drawings, in which like characters of reference designate corresponding parts throughout the several views, the numeral 1 designates a vehicle wheel having a hub 2, a relatively wide flat rim 3 and disks 4 at the outer edges of the rim connecting the latter to the hub. A flanged traction rim 5, suitable for use upon a rail of a track (not shown) is adapted to be placed upon the rim 3 of the wheel and is adapted to slide transversely thereof. The inner surface of the flanged rim 5 is preferably provided with a plurality of spaced relatively shallow transversely extending recesses 6 which are adapted to register with a plurality of spaced relatively deep transversely extending peripheral recesses 7 in the wheel rim 3.

A plurality of substantially rectangular shaped keys 8 are adapted to be inserted in the registering recesses 6 and 7 and are adapted to be expanded at the ends to retain the flanged rim 5 in adjusted position upon the wheel rim 3. Each key is preferably provided at its opposite ends with transversely extending recesses 9 which have longitudinally extending inwardly converging sides 10 and which connect at their inner ends into a pair of spaced transversely extending openings 11. A pair of wedge-shaped members 12 are adapted to engage the converging sides of the recesses of each key and are preferably mounted upon a bolt 13 which extends through the transverse web 14 between the openings 11. Any suitable tool (not shown) may be applied to the head of the bolt to adjust the wedge-shaped members inwardly to expand the ends of the key against the bottom walls of the registering recesses to retain the flanged rim in position upon the wheel rim. The opposite faces of each key are preferably serrated at the ends thereof, as shown at 15, so as to prevent any likelihood of the keys slipping or working loose when the wedge-shaped members have been adjusted. In order to reinforce the wedge-shaped members, a rib 16 is preferably formed upon the bottom wall of each recess 7 in the wheel rim. This rib preferably extends transversely of the rim and connects into the disk at the sides of the wheel.

Should it be desired to use the vehicle upon the rails of a track having a larger gauge than that which may be obtained by the adjustment of the flanged rims upon the wheel rims of the vehicle wheels, then one or more annular members 17 may be used to provide rim extensions for each wheel. Each annular member is preferably provided with an annular flange 18, which may be detachably secured to either of the disks 4 at the sides of the wheel, and is preferably provided with a plurality of spaced relatively deep transversely extending peripheral recesses 19 which are adapted to register with the recesses 7 in the wheel rim when the annular member is secured to the wheel. The outer diameter of the annular member 17 is equal to the outer diameter of the wheel rim so that when the annular member is attached to the wheel, the outer surface of the member will be flush with the outer surface of the wheel rim. Thus the flanged rim 5 may be readily adjusted from the wheel rim onto the annular member, or vice versa. The keys may then be adjusted in the registering recesses 19 and 6 respectively, in the annular member and the flanged rim, to hold the latter in position.

While it is believed that from the foregoing description, the nature and advantages of the invention will be readily apparent, I desire to have it understood that I do not limit myself to what is herein shown and described and that such changes may be resorted to when desired as fall within the scope of what is claimed.

What I claim as my invention is:

1. The combination with a vehicle wheel, of a flanged rim mounted on the rim of said wheel and adjustable transversely thereof, a key disposed between said flanged rim and the rim of said wheel for preventing relative rotation thereof, and means for expanding a portion of said key to detachably secure said flanged rim in adjusted position.

2. The combination with a vehicle wheel having a flat rim, of a flanged rim detachably mounted on said wheel rim and adjustable transversely thereon, said wheel rim having a recess therein, said flanged rim having a recess registering with the recess in said wheel rim, a key engaging the registering recesses in said rims, and means extending longitudinally of said key for expanding a portion thereof against the bottom walls of said recesses to detachably secure said flanged rim in position.

3. The combination with a vehicle wheel having a rim, of a flanged rim detachably mounted on said wheel rim and adjustable transversely thereof, said wheel rim having a recess therein, said flanged rim having a recess registering with the recess in said wheel rim, a key engaging the registering recesses in said rims, said key having a recess in one end thereof, a wedge-shaped member engaging the recess in said key, and means for actuating said wedge-shaped member to expand portions of said key against the bottom walls of said recesses to detachably secure said flanged rim in position.

4. The combination with a vehicle wheel having a rim, of a flanged rim detachably mounted on said wheel rim and adjustable transversely thereof, said wheel rim having a recess therein, said flanged rim having a recess registering with the recess in said wheel rim, a key engaging the registering recesses in said rims, said key having a recess in one end thereof, said key also having an opening at the inner end of said recess, a wedge-shaped member engaging the recess in said key, and a headed element for actuating said wedge-shaped member to expand portions of said key against the bottom walls of said recesses to detachably secure said flanged rim in position.

5. The combination with a vehicle wheel having a rim, of a flanged rim detachably mounted on said wheel rim and adjustable transversely thereof, said wheel rim having a recess therein, said flanged rim having a recess registering with the recess in said wheel rim, a key engaging the registering recesses in said rims, said key having recesses in the ends thereof, wedge-shaped members engaging said recesses and a member extending through a portion of said key for drawing the wedge-shaped members toward each other to expand portions of said key at the ends thereof against the bottom walls of said recesses to detachably secure said flanged rim in position.

6. The combination with a vehicle wheel, of a flanged rim detachably mounted on the rim of said wheel and adjustable transversely thereof, said wheel rim having a recess therein, said flanged rim having a recess registering with the recess in said wheel rim, a key engaging the registering recesses in said rims, said key having serrated surfaces at the ends thereof for engagement with the bottom walls of said recesses, said key also having recesses in the ends thereof, wedge-shaped members engaging said recesses, and a headed element extending through a portion of said key for drawing the wedge-shaped members toward each other to expand the serrated portions of said key.

7. The combination with a vehicle wheel having a rim, of a flanged rim detachably mounted on said wheel rim and adjustable transversely thereof, said wheel rim having a recess therein, said flanged rim having a recess registering with the recess in said wheel rim, means movable transversely of said rims and engageable with said registering recesses for detachably securing said flanged rim in adjusted position, and reinforcing ribs upon the bottom walls of the recesses in said wheel rim.

8. The combination with a vehicle wheel having a rim, of an extension for said rim, a flanged rim movable transversely over said wheel rim and said extension, and means for detachably securing said flanged rim in position.

9. The combination with a vehicle wheel having a flat rim, of an extension for said rim, a flanged rim movable transversely over said wheel rim and said extension, and a key engageable with said wheel rim and said extension for detachably securing said flanged rim in position.

10. The combination with a vehicle wheel having a rim, of an annular member adapted to be secured to either side of said wheel to form an extension of said rim, a flanged rim movable transversely over said wheel rim and said annular member, and means for detachably securing said flanged rim in position.

11. The combination with a vehicle wheel having a rim, of a removable extension for said rim, and a flanged rim movable transversely over said wheel rim and said extension.

12. The combination with a vehicle wheel having a rim, of a flanged rim detachably mounted on said wheel rim and adjustable transversely thereof, and means adapted to be inserted between said flanged rim and said wheel rim for detachably securing said flanged rim in adjusted position.

13. The combination with a vehicle wheel, of a flanged rim mounted on the rim of said wheel and adjustable transversely thereof, an expansible member disposed between said flanged rim and the rim of said wheel for preventing relative rotation thereof, and means for expanding said member to detachably secure said flanged rim in adjusted position.

14. The combination with a vehicle wheel having a rim, of a flanged rim sleeved upon said wheel rim and movable transversely thereof from one side to the other, and means engageable with both of said rims for detachably retaining said flanged rim in any position of adjustment.

In testimony whereof I affix my signature.

JAMES H. CLARK.